US006897597B1

(12) United States Patent
Armiroli et al.

(10) Patent No.: US 6,897,597 B1
(45) Date of Patent: May 24, 2005

(54) ALTERNATOR FOR A VEHICLE WITH TAKE-UP OF PLAY ON THE INTER-POLE MAGNETS

(75) Inventors: Paul Armiroli, Marolles en Brie (FR); Jean-Philippe Badey, Etaples (FR); Denis Gravat, La Ferte Gaucher (FR)

(73) Assignee: Valeo Equipments Electriques Moteur, Creteil (FR)

( * ) Notice: Subject to any disclaimer, the term of this patent is extended or adjusted under 35 U.S.C. 154(b) by 0 days.

(21) Appl. No.: 09/473,012

(22) Filed: Oct. 1, 1999

(30) Foreign Application Priority Data

Oct. 2, 1998 (FR) .............................................. 98 12359

(51) Int. Cl.$^7$ ........................ H02K 21/12; H02K 21/04; H02K 19/22
(52) U.S. Cl. .............. 310/263; 310/156.08; 310/156.31
(58) Field of Search ................................ 310/254, 257, 310/261, 263, 45, 91, 156.31, 156.08; 29/596–598

(56) References Cited

U.S. PATENT DOCUMENTS

| 4,302,693 A | | 11/1981 | Burgmeier et al. ......... 310/156 |
|---|---|---|---|
| 5,038,065 A | * | 8/1991 | Matsubayashi et al. ..... 310/162 |
| 5,306,977 A | | 4/1994 | Hayashi ...................... 310/263 |
| 5,734,216 A | | 3/1998 | Yamada et al. ............. 310/156 |
| 5,747,913 A | | 5/1998 | Amlee et al. ................ 310/263 |
| 5,877,578 A | * | 3/1999 | Mitcham et al. ............ 310/268 |
| 5,903,084 A | * | 5/1999 | Asao et al. .................. 310/263 |
| 5,973,435 A | * | 10/1999 | Irie et al. ..................... 310/263 |
| 6,013,968 A | * | 1/2000 | Lechner et al. ............. 310/263 |
| 6,037,695 A | * | 3/2000 | Kanazawa et al. .......... 310/263 |

FOREIGN PATENT DOCUMENTS

| EP | 0 425 132 | 5/1991 |
|---|---|---|
| EP | 0 762 617 | 3/1997 |
| EP | 0 837 538 | 6/1997 |

OTHER PUBLICATIONS

Patent Abstracts of Japan vol. 098,No. 008, Jun. 30, 1998 & JP 10 066286 A (Hitachi Ltd), Mar. 6, 1998.
"Alternating Current Generator With High Speed Improvement", Research Disclosure, No. 397, May 1, 1997, p. 328 XP00072644, ISSN: 0374–4353.
French Search Report dated Jul. 14, 1999.

* cited by examiner

*Primary Examiner*—Tran Nguyen
(74) *Attorney, Agent, or Firm*—Morgan & Finnegan LLP

(57) ABSTRACT

An alternator for a vehicle comprises two pole pieces having interlaced poles (10) and magnets, the poles exhibiting grooves profiled along an axis (21) and accommodating the magnets, the profile completely preventing the magnets escaping from the grooves in a plane perpendicular to the axis (21).

It has, for each magnet (20), a strip (24) interposed between one face (25, 27) of the magnet and at least one of the grooves (18), the strip (24) being produced from a material which is less hard than the magnet.

30 Claims, 1 Drawing Sheet

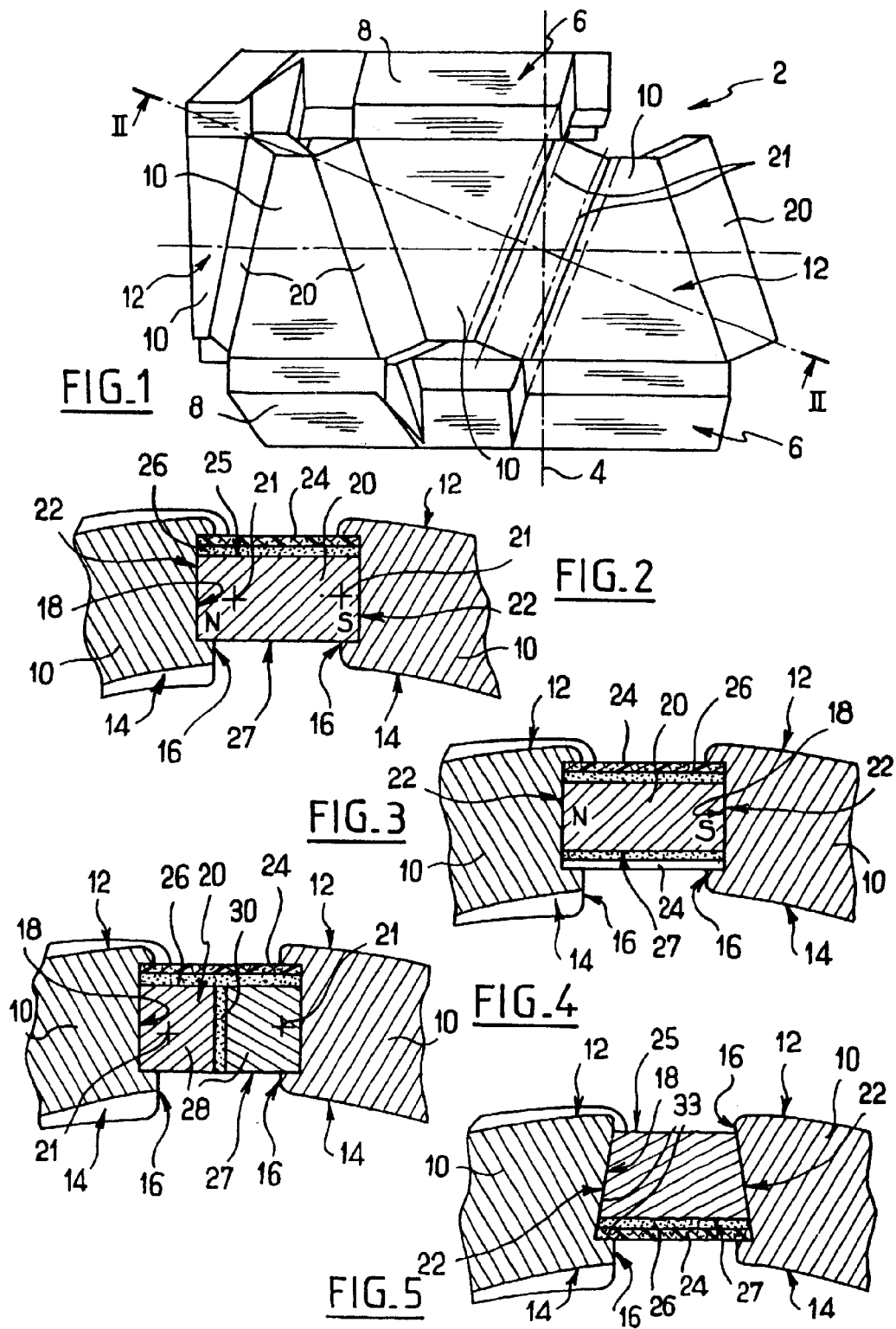

US 6,897,597 B1

ALTERNATOR FOR A VEHICLE WITH TAKE-UP OF PLAY ON THE INTER-POLE MAGNETS

FIELD OF THE INVENTION

The invention relates to the alternators of motor vehicles.

BACKGROUND OF THE INVENTION

An alternator for a vehicle is known from the document EP-0 762 617 A1, and comprises pole pieces having poles in the form of interlaced claws, and inter-pole permanent magnets interposed between the adjacent claws. The magnets reduce the leakages of magnetic flux and contribute to reinforcing the magnetic flux. When the manufacturing tolerances of the pieces are made relatively wide in order to reduce costs, an inter-pole magnet may break under the effect of the centrifugal forces and the considerable heating engendered by the rotation of the rotor at high speed (opening of the pole horns).

One object of the invention is to supply an alternator allowing the magnets to be fixed while reducing the risk of breaking the magnet, without requiring very fine manufacturing tolerances.

SUMMARY OF THE INVENTION

An alternator for a vehicle is provided according to the invention, comprising two pole pieces having interlaced poles and a magnet, the poles exhibiting grooves profiled along an axis and accommodating the magnet, the profile completely preventing the magnet escaping from the grooves in a plane perpendicular to the axis, which is distinguished in that it comprises a strip interposed between one face of the magnet and at least one of the grooves, the strip being produced from a material which is less hard than the magnet.

Hence, because of its flexibility, the strip takes up the play due to the manufacturing tolerances and absorbs the deformations of the pieces caused by the heating and the forces which are generated by the high rotational speeds. This reduces the risk of breaking the magnet.

Advantageously, the strip is interposed between the magnet and each of the grooves.

Hence the strip takes up the play in each groove along an axis radial to the shaft of the rotor.

Advantageously, the strip covers one circumferential face of the magnet.

Hence, the arrangement of the magnet in the grooves remains symmetric with respect to a median longitudinal plane of the inter-pole space situated at mid-distance of the poles. Thus the symmetry of the magnetic field is preserved.

Advantageously, the circumferential face is oriented in a direction opposite to a shaft of the alternator.

Hence, the positioning of the magnet as close as possible to the gap is facilitated.

Advantageously, the alternator comprises a layer of adhesive which is more flexible than the magnet and is interposed between the strip and the magnet.

Hence, this layer of adhesive itself also contributes to damping the deformations and to taking up the play.

Advantageously, the alternator comprises two strips interposed between respective opposed faces of the magnet and at least one of the grooves.

Advantageously, the magnet includes two separate parts bonded to one another by a layer of material which is more flexible than the magnet.

Hence, additional take-up of play and additional damping of deformations are provided, in a direction which may be different from the direction of take-up of the play associated with the strip.

Advantageously, the material is identical to the adhesive bonding the strip to the magnet.

Advantageously, the profile of each groove is "U"-shaped.

Advantageously, the profile of each groove is "V"-shaped, the "V" profile having one branch locally parallel to a circumferential face of the poles.

Advantageously, the "V" exhibits two branches, the parallel branch being closer to a shaft of the alternator than the other branch.

Advantageously, the alternator comprises several magnets, at least two of the magnets, or even most of them, preferably all of them, being associated with respective strips.

Advantageously, the strips of the respective magnets are independent of one another.

Hence, the strips can be fitted separately and successively.

BRIEF DESCRIPTION OF THE DRAWINGS

Other characteristics and advantages of the invention will emerge further from the following description of several preferred embodiments given by way of non-limiting examples. In the attached drawings:

FIG. 1 is a partial view in elevation of a rotor of an alternator according to the invention;

FIG. 2 is a partial view in section along the line II-II of the rotor of FIG. 1; and FIGS. 3, 4 and 5 are views similar to FIG. 2 illustrating other embodiments.

DESCRIPTION OF THE PREFERRED EMBODIMENTS

In the present embodiment, the electrical alternator for a motor vehicle according to the invention is intended to the cooled by water by being incorporated into the loop of the cooling circuit of the vehicle in a way which is known in the art. The alternator can be integrated, for example, for this purpose in series or in parallel with the radiator for heating the passenger compartment. Alternatively, the alternator may be of the type with internal ventilation.

The alternator includes a stator and a rotor 2 equipped with a shaft with axis 4, which are of a conventional type known in the art, for example from the document EP-0 762 617, except as far as the poles and the inter-pole magnets are concerned. The rotor includes two pole pieces 6 each comprising a disc-shaped plate 8 mounted coaxially on the shaft. The two plates 8 extend in coincidence and parallel to one another.

Each pole piece 6 includes claw-shaped poles 10, which are generally flat and triangular, extending from the plate 8 towards the other plate. The poles of the pole pieces are mutually interlaced, so that the point of each pole 10 extends very close to the plate 8 of the other pole piece.

The two pole pieces 6 are associated with the respective North and South magnetic poles. Each pole 10 exhibits two respectively outer convex 12 and inner concave 14 circumferential faces, and two flat lateral faces 16 forming two of the sides of the triangle and contiguous with the circumferential faces. The lateral faces 16 of the poles 10 extend facing each other at a distance. Such an arrangement is known in itself.

In the present embodiment, each lateral face 16 exhibits a groove 18 or slot with a "U" profile, the groove having an axis 21 extending along a longitudinal direction of the lateral face 16. The slot 18 exhibits a flat bottom and two sides perpendicular to it.

The rotor includes permanent magnets 20 here having a generally rectangular parallelepipedal shape and especially a profile which is rectangular perpendicularly to a longitudinal direction of the magnet. Each magnet 20 is accommodated between the lateral faces 16 of two respective poles 10 with its lateral faces 22 in the slots 18 possibly with a layer of adhesive interposed at the bottom of the grooves.

Each magnet 20 is polarized North-South along a direction extending from one of its lateral faces 22 to the other.

Each pair of grooves 18 facing one another define a magnet housing 20, the profile of the grooves preventing the magnet coming out of the housing in a plane perpendicular to an axis 21 of the grooves once the poles 10 are mutually interlaced. In order to insert a magnet into its housing or to extract it from the housing, the magnet can, for example, be made to slide parallel to the axis 21 of the grooves as far as the axial extremity of the housing.

The rotor 2 comprises, for each magnet 20, a strip 24 or plate of a material which is less hard and more flexible than the material of the magnet. In this case, the strip is glass fiber embedded in a pre-impregnated plastic. The strip 24 is flat and rectangular and has the same dimensions and the same shape as the outer circumferential face 25 of the magnet 20 which it covers over, with its edges in coincidence. A layer 26 of adhesive which is more flexible than the magnet 20 is interposed between the magnet 20 and the strip 24. The strip 24 and the layer of adhesive 26 each extend in the two grooves 18, being interposed between the circumferential outer face 25 of the magnet and one of the sides of the groove 18. The circumferential outer face 25 of the magnet is oriented in a direction opposite to the shaft of the rotor, in contrast to the circumferential inner face 27 of the magnet which is oriented towards this shaft.

By virtue of the flexibility of the strip 24 and of the layer of adhesive 26, the play due to manufacturing tolerances is taken up in a direction radial to the axis 4 of the rotor. Moreover, when the rotor is turning at high speeds, the deformations of the pieces due to the forces and the heating caused by the rotation of the rotor are damped.

For assembly, the strip 24 can be bonded to each magnet 20, and then the unit thus constituted inserted into its housing.

Alternatively, each magnet 20 can be inserted into its housing, then the strip 24 can be inserted and bonded to the magnet.

In the embodiment of FIG. 3, the rotor further comprises, for each magnet 20, a second strip 24 covering over the circumferential inner face 27 of the magnet 20 with a layer of adhesive 26 being interposed, the strip and layer of adhesive being similar to those of FIG. 2.

In the embodiment of FIG. 4, the magnet comprises a single strip 24, as in FIG. 2. The magnet 20 comprises two separate magnet parts 28 directly bonded to one another by a layer 30 of a material which is more flexible than the magnet. This material may, for example, take the form of a silicone adhesive advantageously comprising iron in order to provide a better magnetic continuity through the layer of adhesive 30. The two magnet parts 28 each have a rectangular parallelepipedal shape and are identical to each other in their shape and their dimensions. The layer 30 extends in a median longitudinal plane of the magnet, at mid-distance from each of the two poles 10, perpendicular to the direction of polarization of the magnet and parallel to the axis 21 of the grooves.

This separation of the magnet into two parts 28 also provides take-up of the play and compensation for deformations, in a direction which is not parallel, but in this case perpendicular, to that associated with the strip 24.

In the embodiment of FIG. 5, the magnet 20 is similar to that of FIG. 2, but the strip 24 covers over its inner circumferential face 27 and not its outer circumferential face.

The grooves 18 in this embodiment have a "V" profile, with two branches 33 inclined with respect to one another. That one 33 of the two branches which is the closer to the axis 4 of the rotor is locally parallel to the circumferential faces 12, 14 of the poles. The strip 24 is interposed between the magnet 20 and the side of the groove defined by this branch 33 of the profile. The magnet 20 has a trapezoidal profile. The larger 27 of the two sides 25, 27 of the trapezium shaped magnet which are parallel to each other extends against the sides 33 of the grooves 18 which are closer to the shaft of the rotor. The other two sides 22 of the trapezium shaped magnet are in surface contact with the other sides of the grooves 18.

Although it is less advantageous, the strip 24 may extend between a lateral face 22 of the magnet 20, and one of the poles 10, in any one of these embodiments.

The strip 24 may consist of two parts separated along a median line, distant from one another and each housed in one of the grooves 18.

Advantageously, the layer of adhesive 26, 30 will be the same as that interposed between the grooves 18 and the lateral faces 22 of the magnets.

What we claim is:

1. An alternator for a vehicle, comprising
   two pole pieces having mutually interlaced poles, and
   a magnet, the poles including a first flange and a second flange, the first flange and the second flange forming an undercut groove therebetween, the groove profiled substantially, axially along lateral peripheral sides of each pole body, wherein the grooves engage the magnet between two interlaced poles, the groove profile preventing the magnet from escaping perpendicularly from the groove, and
   a strip interposed between a face of the magnet and a first portion of at least one of the grooves, the strip being produced from a nonmagnetic material having less hardness than hardness of the magnet, wherein the strip is formed with a predetermined dimension in a radial direction of the rotor to operatively dampen deformation of the pole pieces.

2. The alternator as claimed in claim 1, wherein the strip is interposed between the magnet and the first portion of each of the grooves.

3. The alternator as claimed in claim 1 wherein the strip covers a circumferential face of the magnet.

4. The alternator as claimed in claim 3, wherein the circumferential face is oriented in a direction opposite to a shaft of the alternator.

5. An alternator for a vehicle, comprising
   two pole pieces having mutually, interlaced poles, and
   a magnet, the poles including grooves profiled substantially axially along lateral peripheral sides of each pole body, wherein the grooves engage the magnet between two interlaced poles, the groove profile preventing the magnet from escaping perpendicularly from the grooves, a first strip interposed between a face of the magnet and a first portion of at least one of the grooves, the first strip being produced from a nonmagnetic material having less hardness than hardness of the magnet, and a second strip produced from a nonmagnetic material also having less hardness than hardness of the magnet, the second strip interposed between an opposed face of the magnet and a second portion of at least one of the grooves, the first strip and the second strip respectively formed with a predetermined dimension in a radial direction of the rotor to operatively dampen deformation of the pole pieces.

6. The alternator as claimed in claim 1, wherein the groove profile of at least one groove is "U"-shaped.

7. The alternator as claimed in claim 1, wherein the groove profile of at least one groove is "V"-shaped, the "V"-shaped groove profile having a first branch which is locally parallel to a circumferential face of the poles.

8. The alternator as claimed in claim 7, wherein the "V"-shaped groove profile has two branches, the first branch closer to a shaft of the alternator than the other branch.

9. The alternator as claimed in claim 1, further comprising a layer of adhesive which is more flexible than the magnet and is interposed between the strip and the magnet.

10. The alternator as claimed in claim 9, wherein the magnet includes two separate parts bonded to one another by a layer of material which is more flexible than the magnet.

11. The alternator as claimed in claim 10, wherein the material is identical to the adhesive.

12. The alternator as claimed in claim 1 having a plurality of magnets and a plurality of strips, wherein at least two of the plurality of magnets are associated with respective strips.

13. The alternator as claimed in claim 12, wherein a majority of the magnets are associated with respective strips.

14. The alternator as claimed in claim 12, wherein the strips comprise parts that are independent of one another.

15. The alternator as claimed in claim 1, wherein the strip comprises glass fiber embedded in pre-impregnated plastic.

16. An alternator for a vehicle, the alternator comprising:

a magnet;

two pole pieces having mutually interlaced poles, the poles having inner flanges and outer flanges which form undercut grooves therebetween, the grooves profiled substantially axially along lateral peripheral sides of each pole body, the magnet interposed in the grooves between two interlaced poles, the groove profile preventing the magnet from escaping the grooves in a plane perpendicular to the groove profile; and a first strip of nonmagnetic material less hard than the magnet, the first strip interposed between a circumferential face of the magnet and the length of a first portion of at least one of the grooves, the first portion of the groove extending parallel to the circumferential face wherein the strip is formed with a predetermined dimension in a radial direction of the rotor to operatively dampen deformation of the pole pieces.

17. The alternator of claim 16 wherein the first strip is interposed between the magnet and the length of first portion of each of the grooves.

18. The alternator of claim 16 wherein the first strip covers a circumferential face of the magnet.

19. The alternator of claim 18 wherein the circumferential face is oriented in a direction opposite to a shaft of the alternator.

20. The alternator of claim 16 further comprising a second strip of nonmagnetic material, the first strip and the second strip interposed between respective opposed faces of the magnet and the first portion and a second portion respectively of at least one of the grooves, the second portion of the groove extending parallel to the circumferential face.

21. The alternator of claim 16 wherein at least one groove is "U"-shaped.

22. The alternator of claim 16 wherein at least one groove is "V"-shaped, with a first branch of each "V"-shaped groove locally parallel to a circumferential face of the poles.

23. The alternator of claim 22 wherein the first branch is closer to a shaft of the alternator than the other branch of the "V"-shaped groove.

24. The alternator of claim 16 further comprising a layer of adhesive more flexible than the magnet, the layer of adhesive interposed between the first strip and the magnet.

25. The alternator of claim 24 wherein the magnet includes two separate magnet portions bonded to one another by a layer of material more flexible than each of the magnet portions.

26. The alternator of claim 25 wherein the material of the layer is identical to the adhesive.

27. The alternator of claim 16 comprising a plurality of magnets and a plurality of strips, wherein at least two of the plurality of magnets are associated with respective strips.

28. The alternator of claim 27 wherein the respective strips comprise parts that are independent of each other.

29. The alternator of claim 16 wherein the first strip comprises glass fiber embedded in pre-impregnated plastic.

30. An alternator for a vehicle, the alternator comprising:

a magnet;

two pole pieces having mutually interlaced poles, the poles having radially inner flanges and radially outer flanges with respect to the axial axis of the pole, wherein the outer flanges and corresponding inner flanges form undercut grooves profiled substantially axially along lateral peripheral sides of each pole body, the magnet interposed in the undercut grooves between two interlaced poles, the groove profile preventing the magnet from escaping perpendicularly from the undercut grooves;

a strip of nonmagnetic material less hard than the magnet, the strip interposed between the magnet and a portion of at least one of the grooves, the strip covering a circumferential face of the magnet oriented in a direction opposite to a shaft of the alternator; and a layer of adhesive more flexible than the magnet, the layer of adhesive interposed between the strip and the magnet, and wherein the strip and the adhesive layer are formed with a predetermined dimension in a radial direction of the rotor to operatively dampen deformation of the pole pieces.

* * * * *

UNITED STATES PATENT AND TRADEMARK OFFICE
CERTIFICATE OF CORRECTION

PATENT NO. : 6,897,597 B1
DATED : May 24, 2005
INVENTOR(S) : Armiroli et al.

It is certified that error appears in the above-identified patent and that said Letters Patent is hereby corrected as shown below:

Column 4,
Line 48, after the word "than", insert the word -- the --.
Line 61, the phrase "having mutually, Interlaced poles" should read -- having mutually interlaced poles --.

Column 5,
Lines 4 and 6, after the word "than", insert the word -- the --.
Line 59, after the phrase "the length of", insert the word -- the --.

Signed and Sealed this

Twelfth Day of July, 2005

JON W. DUDAS
*Director of the United States Patent and Trademark Office*